United States Patent [19]

Fukahori et al.

[11] 4,258,997
[45] Mar. 31, 1981

[54] CAMERA AND ELECTRIC MOTOR DRIVE THEREFOR

[75] Inventors: Hidehiko Fukahori, Kawasaki; Tomonori Iwashita, Fuchu; Yukio Mashimo, Tokyo, all of Japan

[73] Assignee: Canon Kabushiki Kaisha, Tokyo, Japan

[21] Appl. No.: 78,764

[22] Filed: Sep. 25, 1979

[30] Foreign Application Priority Data

Sep. 28, 1978 [JP] Japan .............................. 53-119492

[51] Int. Cl.³ ........................... G03B 1/12; G03B 1/00
[52] U.S. Cl. .................................... 354/173; 354/212
[58] Field of Search ............................... 354/170–172, 354/173, 213, 214, 212

[56] References Cited

U.S. PATENT DOCUMENTS

| 3,613,542 | 10/1971 | Wiessner et al. | 354/171 |
| 3,640,201 | 2/1972 | Kimura | 354/173 |
| 3,754,455 | 8/1973 | Tsujimoto et al. | 354/173 |
| 3,903,466 | 9/1975 | Kondo | 354/213 X |
| 3,946,410 | 3/1976 | Maida | 354/173 |
| 3,995,292 | 11/1976 | Kondo | 354/173 |
| 4,175,845 | 11/1979 | Iwashita et al. | 354/173 |
| 4,190,341 | 2/1980 | Sugimori | 354/212 X |

Primary Examiner—Donald A. Griffin

[57] ABSTRACT

The disclosed device winds film in a continuous rapid-sequence mode or a non-continuous single-frame mode. A disengagement arrangement responds to a winding completion signal after each frame is wound in the continuous mode and disengages the transmission during the subsequent shutter release, but allows the transmission to remain engaged in the non-continuous mode and at the end of a winding sequence in the continuous mode. According to one embodiment, the disengagement arrangement contains an electromagnet that also actuates the camera's shutter release in the continuous mode.

10 Claims, 10 Drawing Figures

FIG.5
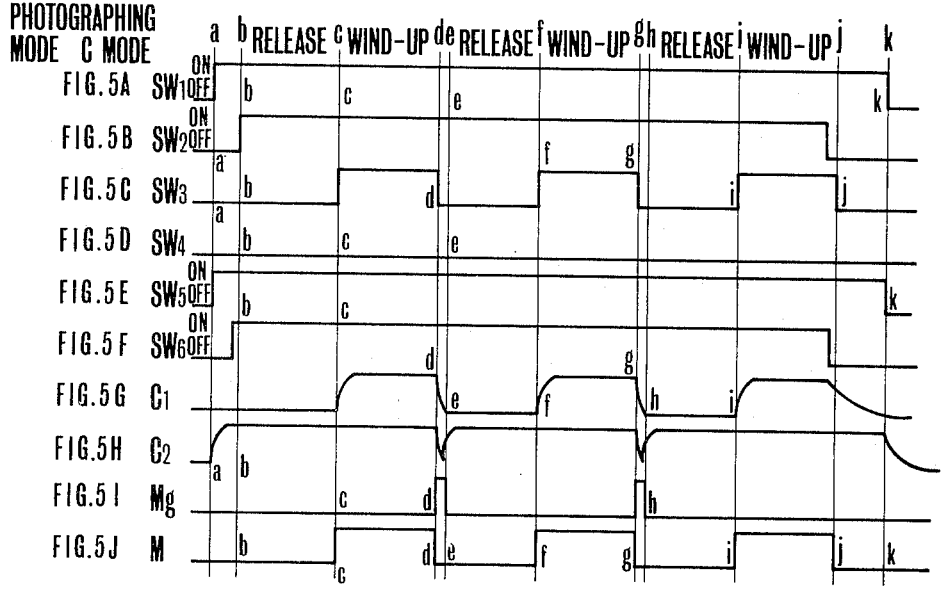
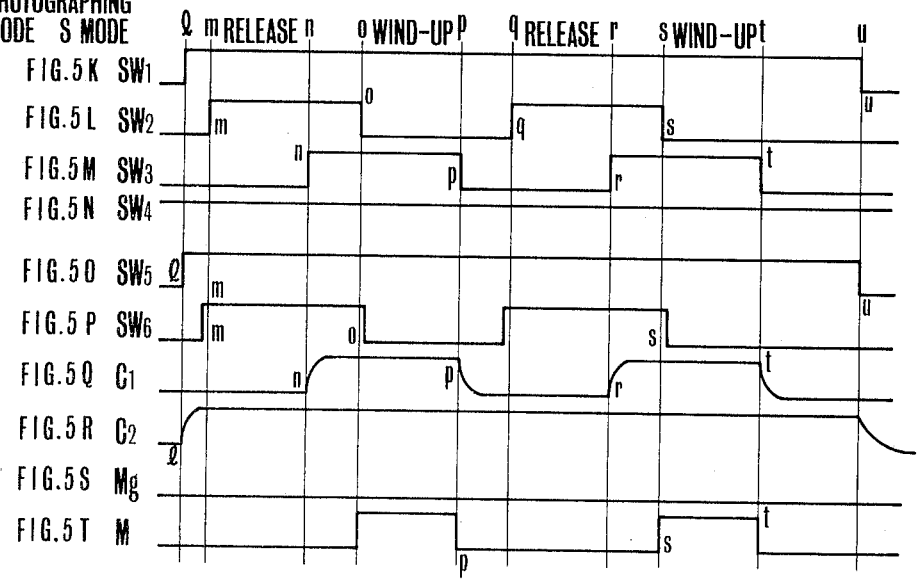

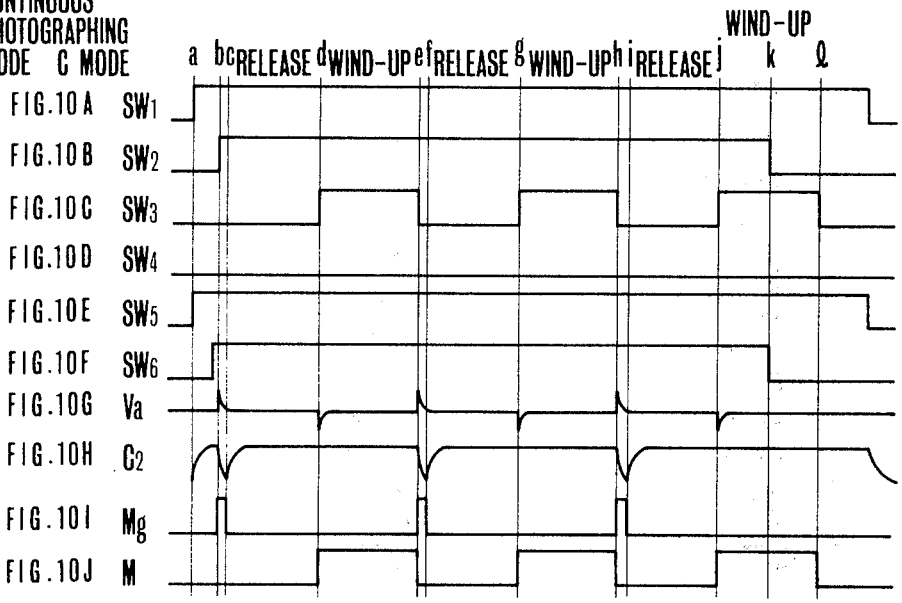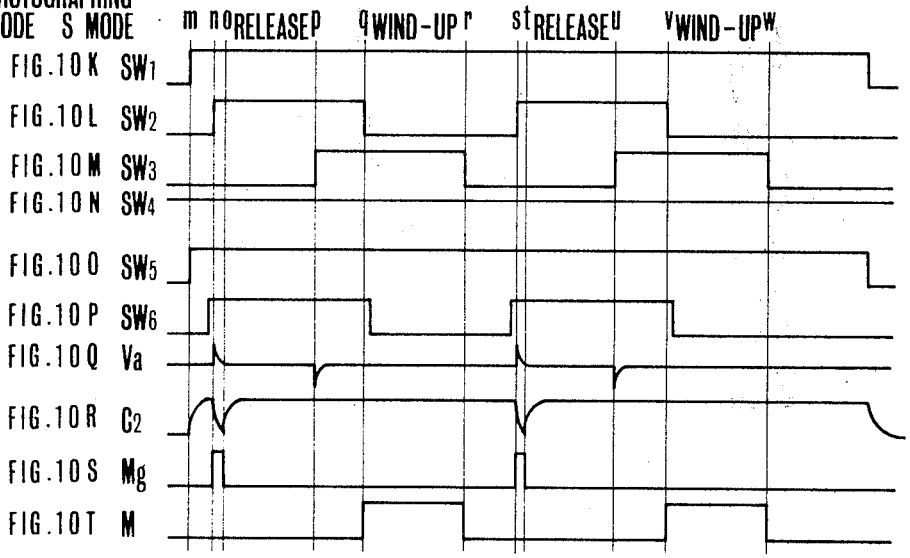

CAMERA AND ELECTRIC MOTOR DRIVE THEREFOR

BACKGROUND OF THE INVENTION

1. Field of the Invention

This invention relates to cameras, and particularly, to a camera motor drive which performs film winding and shutter energizing operations.

2. Description of Prior Art

In one type of conventional automatic camera film winder, the winder is started upon completion of the shutter closing process and then stopped upon having completed the winding of a frame of film; the shutter is then released immediately after completion of the film winding process. However, immediately after completion of a film winding action, each part of the film winding mechanism still remains loaded or stressed, i.e., in motion, because of the inertia of the motor and the winding mechanism. Hence, if the shutter release starts immediately after a film winding action, the film is likely to be exposed to light before it actually stops. Such a conventional arrangement thus introduces the possibility of blurred pictures.

In addition to this problem, with the coupled parts of a shutter release mechanism and the film winding mechanism being in a stressed condition, each mechanism might be prevented from operating smoothly or might even be rendered inoperative. To eliminate these difficulties, it is desirable to remove the stressed or loaded condition. During non-continuous operation, one frame of film at a time is used, thus obviating the stressed condition because a sufficiently long period of time elapses between completion of film winding and shutter release. The condition is also absent after the last frame of film has been wound in a continuous photographic operation.

A conventional automatic film winding device is provided with a sliding clutch in its transmission gear mechanism and is arranged to absorb any excessive load or stress developed after completion of a film winding action because of the sliding action thereof removing the strain resulting from the film winding action. However, this method involves detecting the excessive stress after it has occurred. This response to detecting the completion of a film winding action results in delays. Besides, the provision of the sliding clutch in the film winding gear complicates the film winding mechanism and hinders efforts to reduce the size of the device. Furthermore, an excessive load is imposed on the motor by initiation of the sliding action of the sliding clutch and this overload on the motor makes adjustment thereof difficult. Also, the use of such a sliding clutch during a continuous picture taking sequence with an electromagnetic release type camera tends to expose the film to light during operation of the sliding clutch because shutter release begins immediately after a film winding action. In order to prevent this, the shutter release is arranged to begin in response to a signal representing completion of operation of the sliding clutch. A delay in the completion of a film winding action would occur after the film is actually wound and the film feed speed would then be decreased.

An attempt to solve these problems appears in Japanese Laid Open Patent Application, Publication No. 53-39123 which discloses an electric film winding device. In this device, an electromagnetic clutch, disposed in a film winding gear driving mechanism, is arranged to be turned off, upon completion of a film winding action, to disconnect the winding gear of the motor and prevent it from being overloaded. In this prior art device, the electromagnetic clutch is off when non-energized and is turned on when energized. The power supply to the clutch is cut off every time a winding action is completed. In carrying out a continuous photographic operation, the overloading which otherwise takes place every time a film winding action is completed, is effectively prevented by the electromagnetic clutch before the next exposure is initiated so that transition to the next exposure can be effected in a short period of time.

However, in a non-continuous picture taking operation, or before starting a continuous picture taking operation following a non-continuous operation, an ample length of time exists between a photographic operating cycle on one film frame and the next cycle on another, ie., before the next exposure action and the next film winding action. In such a case, the arrangement for operating an electromagnetic clutch to prevent overload is unnecessary. Even if an overloaded condition arises, upon completion of a film winding action, which is performed after completion of a non-continuous, single-frame, photographic operation, the overload can be eliminated during this amply long time interval before the next operation and the overloaded condition thus disappears in time. Hence, the electromagnetic clutch which turns off every time a film winding action is completed, wastes electric power as it operates even when its operation is not required. Moreover, in this example of the prior art, the electromagnetic clutch is disposed directly within the film winding gear driving mechanism. This arrangement necessitates having the electromagnetic clutch intermittently turning the transmission torque on and off, making the size of the clutch relatively large. The relatively large size of the electromagnetic clutch introduces the problem of placing it in the limited space of a compact electric motor drive film winder.

SUMMARY OF THE INVENTION

It is an object of the present invention to provide a camera electric motor drive which eliminates the shortcomings of the conventional devices described in the foregoing.

It is another object of this invention to provide a compact electric film winder having an electromagnetic clutch arrangement that permits reduction in size of the device.

According to a feature of the invention, these objects are attained in whole or in part by connecting a drive source to a transmission mechanism capable of being disengaged, and disengaging the transmission mechanism at the end of every drive cycle in the continuous driving mode, while retaining the engagement in the non-continuous mode.

According to another feature of the invention, the transmission mechanism is disengaged by electromagnetic means.

According to still another feature, the electromagnetic means includes a link that initiates shutter operation in the continuous mode.

These and other features are pointed out in the claims, Other objects and advantages of the invention will become evident from the following detailed description when read in light of the accompanying drawings.

BRIEF DESCRIPTION OF THE DRAWINGS

FIGS. 5A to 5T are timing diagrams showing the operation of the drive embodying the invention as shown in FIGS. 1 through 4.

FIGS. 10A to 10T are timing diagrams showing the operation of the device shown in FIGS. 6 through 9.

DETAILED DESCRIPTION OF PREFERRED EMBODIMENTS

Figure 1:
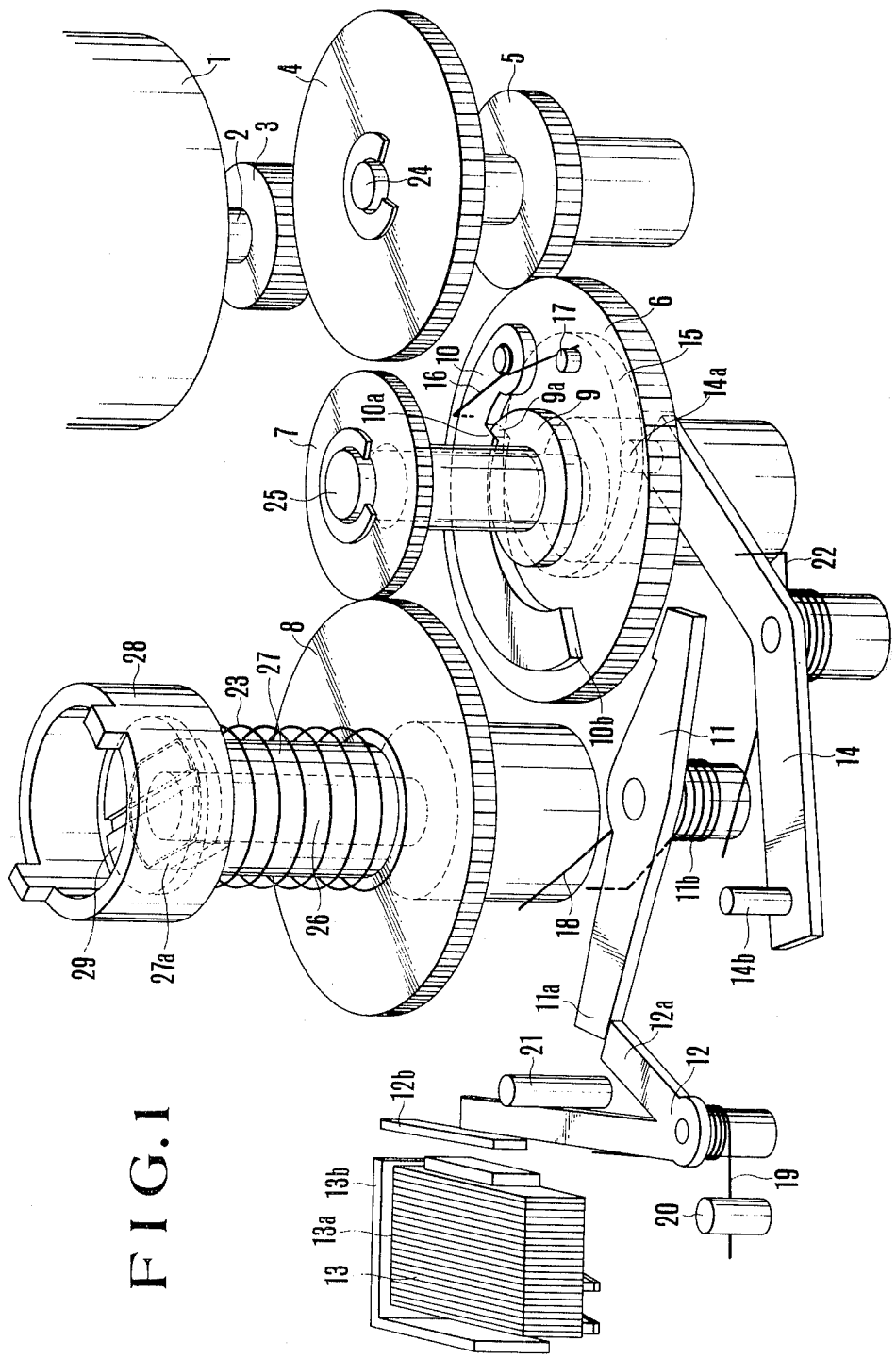
FIG. 1 is a perspective illustration showing a film winding mechanism of an electric motor drive embodying the present invention and showing the film winding mechanism prior to operation of a clutch.

In FIG. 1, a motor 1 with a motor shaft 2 drives a gear or gear wheel 3. A gear 4 engages the gear 3 and rotates with a gear 5 on a shaft 24 on which the gears 4 and 5 are rotatably fitted. (In this specification, the terms "gear" and "gear wheel" are used synonymously.) Another gear 6, fitted on a shaft 25 engages the gear 5. A clutch lever 10 is rotatably mounted above the gear 6 while a charge cam 15 is secured to the underside of the gear 6. On the gear 6, a clutch claw 9 rotatably engages the shaft 25 and rotates a gear wheel 7 which is secured for rotation with the clutch claw. The gear wheel 7 engages a gear wheel 8 which is rotatably fitted on a shaft 26 and integral with a cylinder 27 also rotatable on the shaft 26. The cylinder 27 terminates at its upper part in a key 27a, which is composed of two axially extending flat sections, and which enters a film winding coupler 28 in such a manner so that the latter is movable only in the axial direction relative to the cylinder 27. The coupler 28 is arranged to engage a film winding mechanism (not shown) on a camera body. A coil spring 23, located between the winding coupler 28 and the gear 8 and a screw 29 attached to the shaft 26 define the axial position of the coupler 28.

The gear ratio between the gears 7 and 8 is set so that when the gear 7 rotates 360°, the winding coupler 28 rotates through a predetermined angle, i.e., the camera's film winding angle. In other words, if the winding angle of the camera is 360°, the gear ratio of the gears 7 and 8 is 1 to 1; if the winding angle is 180°, the ratio is 2 to 1; and if it is 120°, the ratio is 3 to 1.

When the winding rotation angle of the gear 7 is set at 360°, the clutch claw 9 stops in the same invariable position each time the film is wound one frame. Accordingly, the position of the clutch lever 10 also stops in the same invariable position each time the film is wound. A clutch release lever 11 rotatably mounted on a fixed frame is urged counterclockwise by a spring 11b, but is held against the force of the spring by an arm 12a of an armature lever 12. A spring 19 pressed against a post 20 urges the lever 12 clockwise against a stop 21. The armature lever 12 releases the clutch claw release 11 when an electromagnet 13 attracts an armature 12b at the end of the longer arm of the lever 12 and swings the lever 12 counter-clockwise against the force of spring 19.

Figure 2:
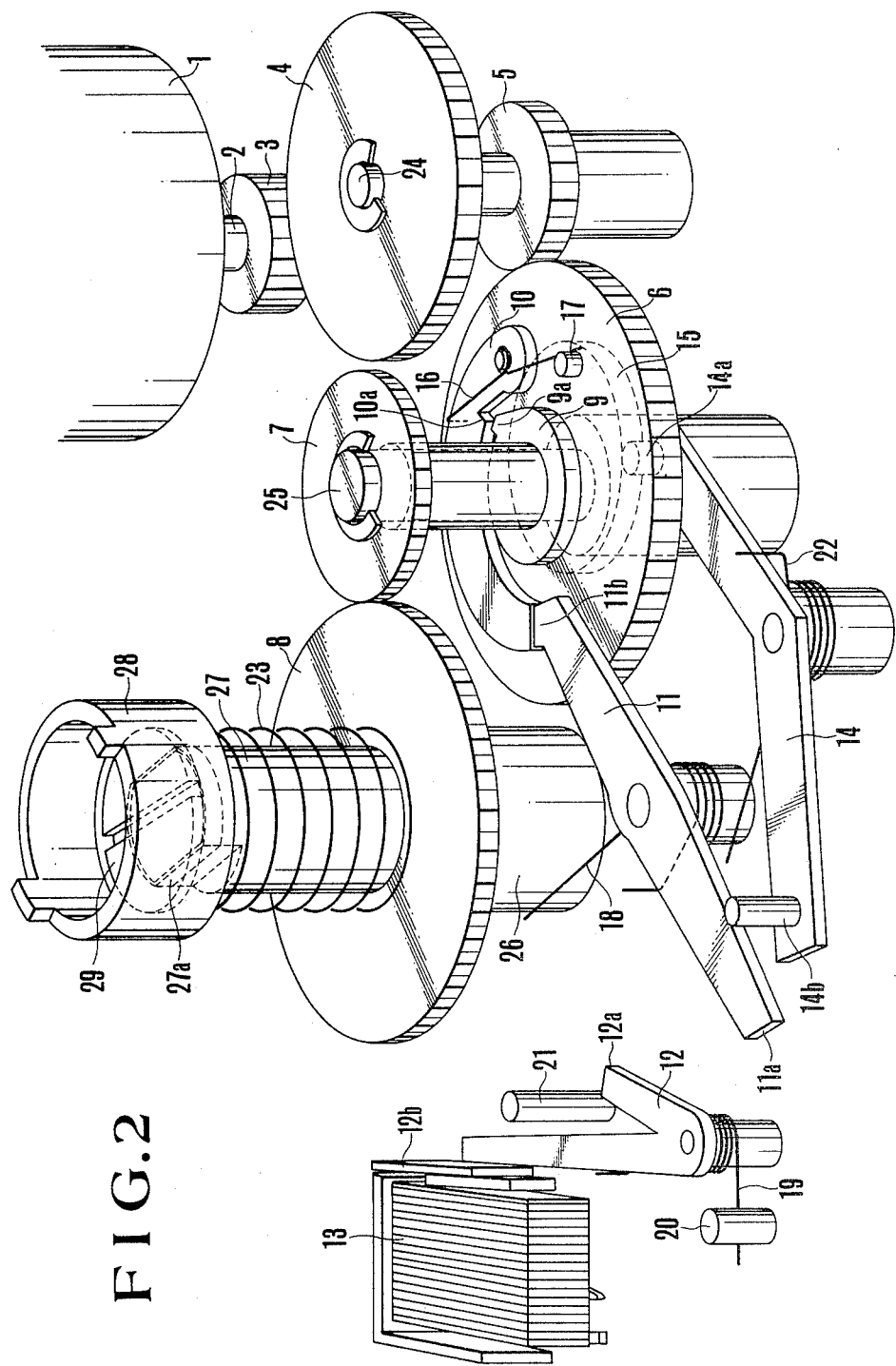
FIG. 2 is a perspective drawing of the device in FIG. 1 after the clutch operation.
Figure 3:
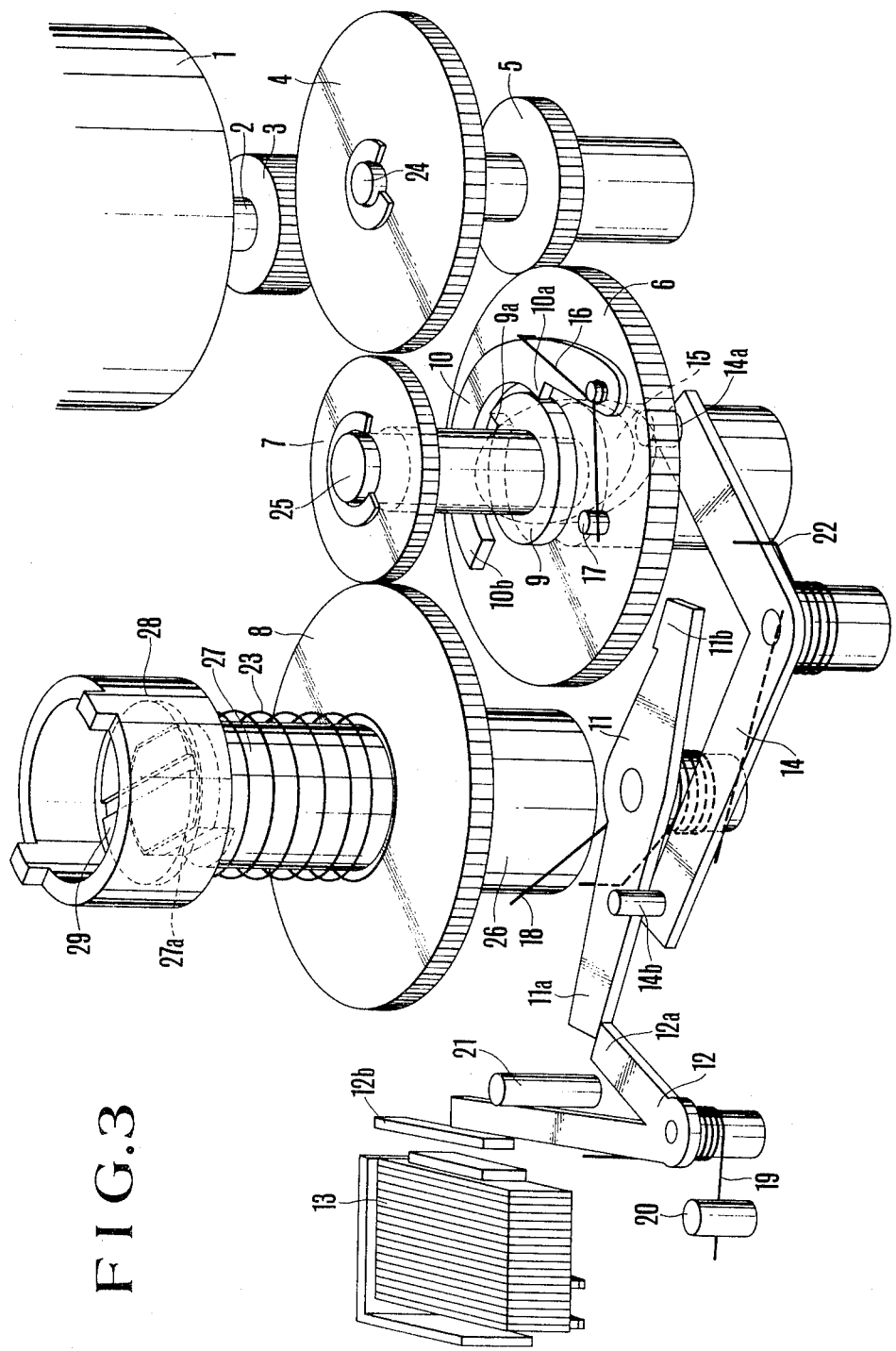
FIG. 3 is a perspective drawing of the device in FIG. 1 after the clutch is energized.

A charge lever 14 carries a cam follower 14a that is biased into sliding engagement with the cam 15 by a spring 22 that urges the lever 14 counterclockwise. A pin 14b at the left end of the lever 14 is located to engage the arm 11a of the lever 11. After the lever 12 has released the lever 11, as shown in FIG. 2, rotation of the cam 15 swings the lever 14 so that the pin 14b moves clockwise, and in turn, moves the lever 11 clockwise until the end 11a of the lever 11 catches behind the arm 12a of the lever 12, as shown in FIG. 3. The lever 12, has in the intervening time, been released by the armature 12 and moved clockwise.

In FIG. 1, the clutch lever 10 is gently urged counter-clockwise by spring 16. When a ratch 10a of the clutch lever 10 engages a face 9a of the clutch claw 9, a film winding transmission gear system is formed from the motor to the winding coupler 28 through the gear train 3, 4, 5 and 6 and further from the clutch lever 10 through the clutch claw 9, the gears 7 and 8, and the cylinder 23.

Figure 4:
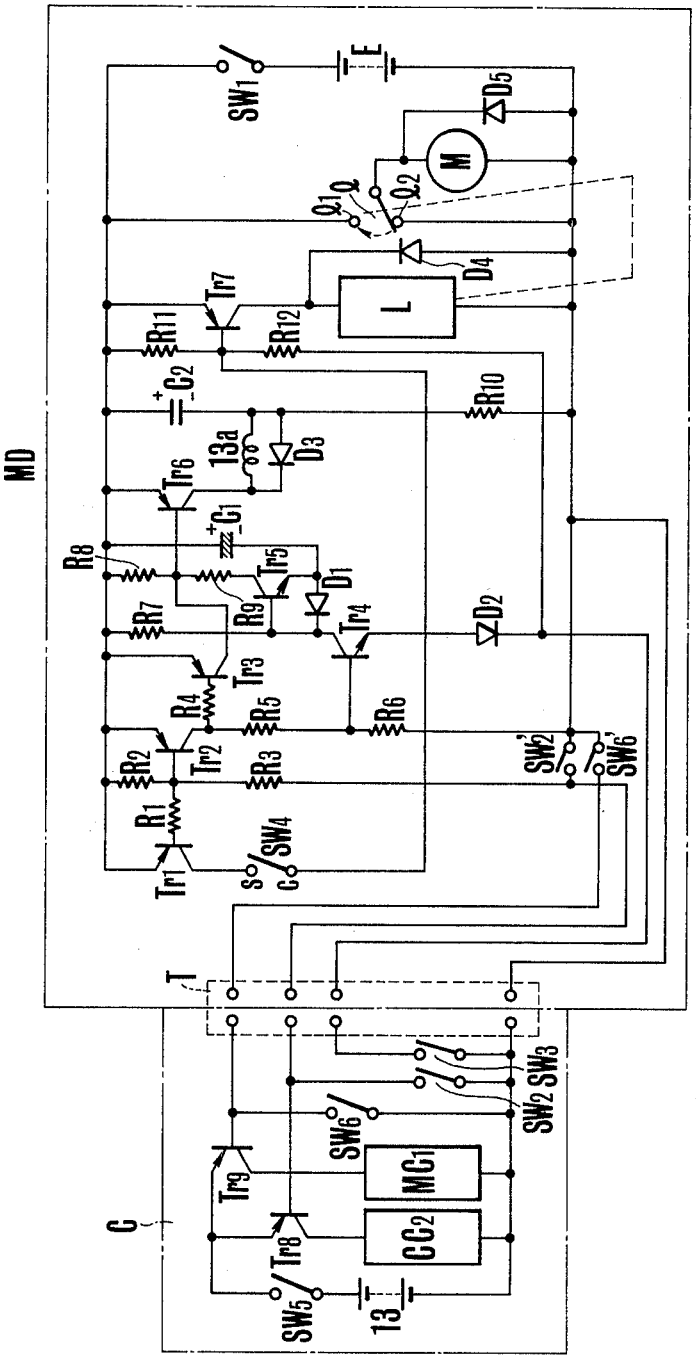
FIG. 4 is a circuit diagram showing the circuit arrangement of the electric motor drive shown in FIGS. 1 through 3.

FIG. 4 is a circuit diagram that, together with the structure shown in FIGS. 1 to 3, forms the electric motor drive embodying the present invention. In FIG. 4, a motor drive control circuit MD forming a part of an embodiment of the present invention is coupled to a camera control circuit C, mounted on a camera with which the motor drive of the present invention is to be used, through terminal T. In the control circuit MD, a battery E energizes the circuitry through a power source switch SW1. The current from the battery E and the switch SW1 passes through the film winding motor 1 through a contact 1 of a relay L when the contact assumes a position $1_1$ as contrasted to 1. A transistor Tr7 drives the relay L.

A switch SW4 is movable between a closed position S in which it selects the noncontinuous or single frame operating mode, and an open position C in which it selects the continuous operating mode. Transistors Tr2 to Tr6 are arranged to control the coil 13a of the electromagnet 13. Two switches SW6' and SW2', which are equivalent to switches SW6 and SW2 on the camera body, are connected parallel to switches SW6 and SW2 and interlocked with an operating button (not shown), but provided on the electric motor drive. The switch SW6' closes in response to a first step during the stroke of this button, while the switch SW2' closes during the second step of the closing stroke.

In the control circuit C of the camera body, a switch SW3 is turned off upon completion of a film winding action, and turned on upon completion of an exposure. The switch SW3 may, for example, be interlocked with the rear diaphragm drum of the camera shutter so as to be opened and closed thereby. A light measuring circuit MC1 is energized by a battery 13 through a power switch SW5 when a transistor Tr9 is turned on. The circuit MC1 measures the brightness of an object to be photographed so as to produce an aperture value suitable for a correct exposure. A control circuit CC2 receives power from the battery B through the switch SW5 when a transistor Tr8 is turned on and thereupon actuates the circuit in the camera body. The control circuit CC2 includes, for example, an electromagnet which actuates the release mechanism of the camera. Such a circuit is well known; because it is not directly relevant to the present invention, further description thereof is omitted.

The switch SW5 connects the battery B to the remainder of the circuit C. The switches SW2 and SW6 are arranged to open and close in response to operation of the shutter release button of the camera. The switch SW6 is turned on during the first step of the stroke of the release button and the switch SW2 at the second step thereof. The circuit MD includes resistors R1 to R11, capacitors C1 and C2, and diodes D1 to D4.

FIGS. 5A to 5T are time diagrams showing the operation of the device in FIGS. 1 through 4. Specifically, FIGS. 5A to 5J illustrate the on or off conditions of the switches SW1 to SW6 and the voltages at various other members during time periods from a to k during a continuous operating mode. FIGS. 5k to 5T illustrate the on or off positions of switches SW1 to SW6 and the voltage conditions at various members during times l to u in the single frame operating mode. To set the continuous operating mode (C mode), the switch SW4 is opened to the position C. The power switches SW1 and SW5 are now closed as shown at the time a. This causes the capacitor C2 to charge through the resistor R10. At this time, the circuit C of the camera and the circuit MD of the motor drive are interconnected at the terminal T. With the ground line thus connected, the switch SW6 is parallel to the switch SW6', and the switch SW2 is parallel to the switch SW2'.

When the shutter button is now depressed, the switch SW6 is closed, and shortly thereafter, at the time b the switch SW2 is closed. The switch SW6 turns on the transistor Tr9 which energizes the measuring circuit MC1 to set the camera aperture. Closing of the switch SW2 turns on the switch Tr8 which energizes the control circuit that operates the shutter release. Upon completion of an exposure at the time c, with the shutter release completed, the switch SW3 grounds the base of the transistor Tr7 through the resistor R12 and turns it on. This energizes the relay L which switches the contact 1 to the position 11 and turns on the motor 1. The motor turns gears 3, 4, and 5. The latter turns the gear 6 360° to complete one film winding action at time d. Upon completion of the winding action, the switch SW3 is turned off. This turns off the transistor Tr7 and the contact 1 of the relay L is connected to the terminal 12 to short circuit the motor 1 and hence, brake the motor.

At the start of the release action, when the switch SW2 was first closed, it not only energized the transistor Tr8, but also turned on a transistor Tr2. This enabled a transistor Tr4. When the switch SW3 was closed at the time c, the transistor Tr4 charged a capacitor C1. At the time d, opening of the switch SW3 turns off the transistor Tr4. This causes the base of NPN transistor Tr5 to rise and turn on the latter so that the capacitor C1 now discharges through the resistors R8 and R9. The resulting current biases on the transistor Tr6 during the discharge time of the capacitor C1. The on transistor Tr6 forms a discharge path for the capacitor C2 through the coil 13a of the electromagnet 13. This occurs between the times d and e, that is, immediately after the gear 6 has turned 360°.

The resulting pulse attracts the armature 12b, rotates the lever 12 counterclockwise against the force of the spring 19. The lever 11 is now released and turned counterclockwise by the spring 18. The lever 11 assumes the position shown in FIG. 2, wherein its end 11b strikes the end 10b of the clutch lever 10 to cause the lever to rotate counterclockwise against the spring 16. The resulting movement disengages the claw 10a from the protrusion 9a, as shown in FIG. 2. This process is completed at the time e.

Concurrently with the completion of the film winding action at the time d, the shutter release button is again activated and begins its stroke. After commencement of this stroke, the actual travel of the front shutter curtain takes place at a time somewhat later than the time e. Therefore, when the film is exposed to light, the transmission system is cut off, as shown in FIG. 2 and the film winding system left open. Hence, the film is stable without having any stress from the transmission gear system. The lever 11 striking the clutch lever 10 not only disengages the clutch lever 10 from the claw 9, but interrupts the transmission from the gear 6 to the gear 7. Hence, any load upon the film is removed prior to the following winding action.

Before the time e, and certainly before the time f, the pulse through the electromagnet 13 ends, and spring 19 drives the lever 12 to the position shown in FIGS. 1 and 3. At the time f, when the release action and exposure is completed, the switch SW3 is again turned on. The transistor Tr7 conducts current to the relay L and the contact 1 shifts up to energize the motor 1 and make it rotate. This rotates the gear 6 clockwise through the gear train 3, 4 and 5. The charge cam 15 causes the lever 14 to rotate against the force of the spring 22. The pin 14b of the lever 14 rotates the lever 11 clockwise against the force of the spring 18 until the lever 11 locks behind the end 12a of the lever 12, as shown in FIG. 3. When the gear 6 is rotated further, the conditions in FIG. 1 prevail. The clutch lever 10 and the clutch claw 9 engage at the part 10a and ratch 9a to close the film winding transmission gear system, and thus, one film winding action is completed with the gear rotated 360°, at the time g in FIGS. 5A to 5J. The same conditions are obtained at the times g and d.

When the shutter release is completed with the clutch operating and when the switch SW2 is turned off, winding of the film is completed and the motor comes to a stop. However, the clutch does not operate when winding of the film is completed. In other words, the next shutter release is not performed concurrently with completion of film winding. Therefore, the time interval before the next shutter release is longer than the length of time required for stabilization of the film and for removal of the load or tension. Therefore, the clutch is not required to operate here. This arrangement is as shown in the circuit diagram of FIG. 4.

In a non-continuous single frame operation, when the drive position corresponds to completion of film winding, the prevailing condition is that shown in FIG. 1 and at time m in FIGS. 5M to 5T. The release switch SW2 is turned on from the time m to release the shutter and to complete an exposure at a time n and is turned off at a time o. Film winding action begins at the time n and the gear rotates 360° to complete the film winding action and the motor comes to a stop at time p. However, since this train of events occurs during non-continuous single frame operation, the next shutter release is not performed concurrently with completion of the film winding action. Therefore, there is no need to utilize the clutch as mentioned in the foregoing. The next shutter release action begins at time q after the lapse of a sufficiently long period of time for stabilizing the film and relieving it of stress or load. Here, the time q corresponds in phase and condition as the time m. Thereafter, the shutter release is completed and the switch SW2 is turned off. Then, the film is wound and the motor comes to a stop.

For continuous automatic exposure, the system operates as follows: It is first assumed that the camera and the motor drive device have completed a film windng action and take the position as shown in FIG. 1. The main switch SW1 and the switch SW5 are turned on in the arrangement as shown in FIGS. 5A to 5F at time a. With the switch SW1 turned on, the capacitor C2 is charged through the resistor R10. Under these circumstances, when the release button, not shown, is depressed at the time b in FIGS. 5A to 5J, the switch SW6 is turned on at the first step in the stroke of the release button. This turns on the transistor Tr9 and energizes the light measuring circuit MC1. The switch SW2 is then turned on at the second step in the stroke of the release button to turn on the transistor Tr8 which, in turn, renders the control circuit CC2 of the camera operative to effect release of the shutter.

Upon completion of an exposure at time c in FIGS. 5A to 5J, after the shutter release action, the switch SW3 turns on. The transistor Tr4 is now turned on and with the switch SW2 on, the capacitor C1 charges through the diode D1, the transistor Tr4, the diode D2 and the switch SW3. The switch SW3 also turns on the transistor Tr7 which causes the relay L to shift the relay contact 1 in the direction of the arrow and connect the contact point 11. This energizes the motor and rotates it. The motor drives the mechanisms illustrated in FIGS. 1 through 3 to wind the film one frame.

Upon completion of the film winding action at the time d, the switch SW3 is turned off and the latter turns off the transistor Tr4. The off transistor Tr4 causes the transistor Tr5 to be biased on and the charged capacitor C1 is discharged through the resistors R8 and R9 and the transistor Tr5 between the times d and e.

The turned off switch SW3 also turns off the transistor Tr7 and demagnetizes the relay L. The contact K is now shifted in the direction opposite to the arrow and both end of the motor M are short-circuited at the time d to stop the motor M.

At the time d, with the switch SW2 on, the transistor Tr2 is also on. As a result, the transistor Tr3 is turned off. Therefore, the transistor Tr6 is turned on and the capacitor C2 discharges through the circuit of the transistor Tr6 and the coil 13a. This energizes the magnet 13 shown in FIGS. 1 to 3. When the discharge of the capacitor C1 is completed, the transistors Tr5 and Tr6 are turned off and the capacitor C2 again begins to charge. Because the camera is in a continuous photographic mode, a new shutter release action begins at the time d concurrently with completion of the film winding action. After the next shutter release, when an exposure is completed at time f in FIGS. 5A to 5J, the switch SW3 turns on to turn on the transistors Tr4 and Tr7 and repeat the aforementioned sequence.

The continuous photographic operation continues as described in the foregoing until the shutter release button is let go after the time i shown in FIG. 5. The transistor Tr2 is now turned off because the switch SW2 is off during the film winding operation after the time i. Upon completion of the film winding operation, at the time j shown in FIGS. 5A to 5J, the switch SW3 is turned on and the transistors Tr4 and Tr7 are thus turned off. This brings the motor M to a stop. The transistor Tr5 is turned on to cause the capacitor C1 to discharge. However, at this time, the transistor Tr2 is off; the transistor Tr3 is on; the transistor Tr6 is off; and the capacitor C2 does not discharge. The electromagnet 13 is therefore not charged and the clutch shown in FIGS. 1 through 3 does not operate.

In the non-continuous or single-frame photographic mode, the C-S (continuous photographic mode/ single-frame photographic mode) selector switch SW4 is turned on. Assuming that the camera has just completed winding film as shown in FIG. 1 and as represented by the time m in FIGS. 5K to 5T, the light measuring circuit MC1 is rendered operative by depression of the release button. The control circuit CC2 is actuated to release the shutter release. Then, the transistors Tr1 and Tr3 are turned on.

Upon completion of an exposure, after shutter release at the time n, the switch SW3 is turned on. The transistor Tr4 is also turned on and the capacitor C1 begins charging. With the transistor Tr1 turned on, however, the transistor Tr7 is off. Thus, when the release button is freed or let go from its depressed condition, at the time o in FIGS. 5K to 5T, the switch Sw2 is turned off; the transistors Tr1 and Tr2 are turned off; the transistor Tr7 is turned on; and, as described in the foregoing, the motor rotates to wind the film.

Upon completion of the film winding action, at the time p in FIG. 5, the switch SW3 is turned off and capacitor C1 discharges. Thereafter, since the transistor Tr2 is off, the transistor Tr3 is turned on; the transistor Tr6 is turned off; the magnet 13 is not charged; and the clutch remains inoperative.

FIGS. 6 to 9 illustrate another embodiment of the invention and FIGS. 10A to 10J and 10K to 10T illustrate the operation of the embodiment in FIGS. 6 to 9, in two different modes.

Figure 6:
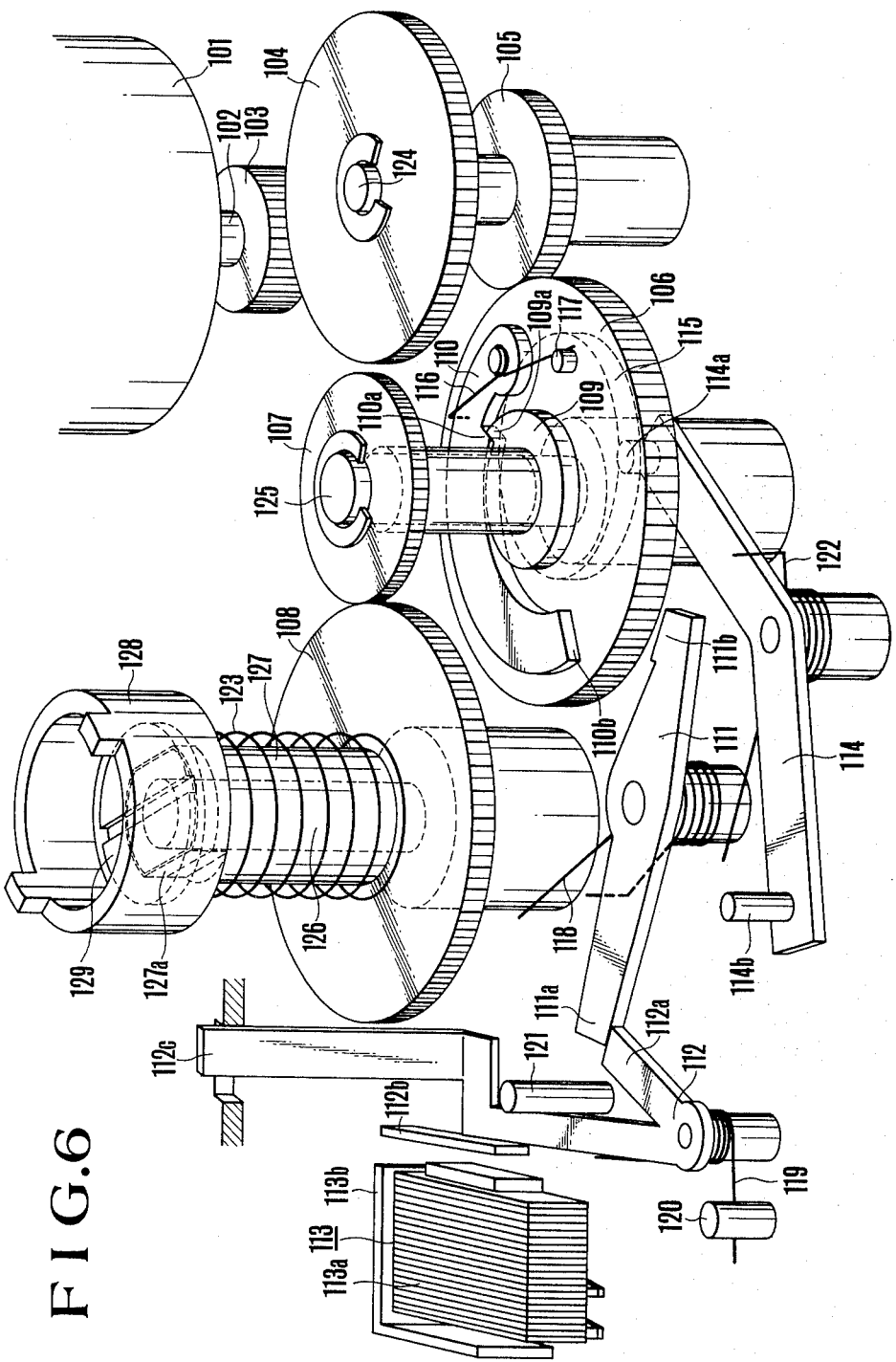
FIGS. 6, 7 and 8 are schematic illustrations showing another film winding mechanism embodying the invention in the same conditions as those shown in FIGS. 1, 2 and 3.
Figure 7:
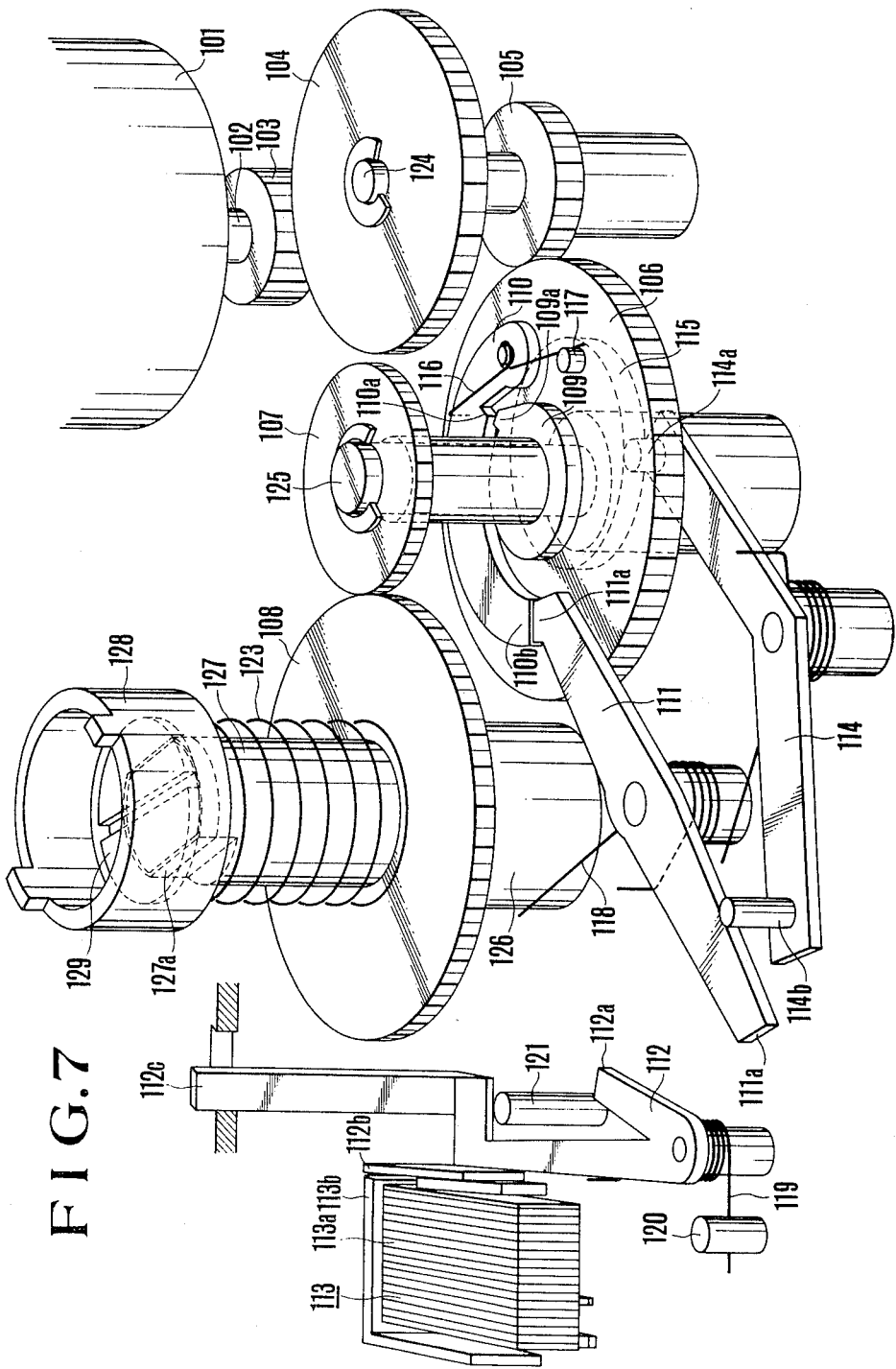
Figure 8:
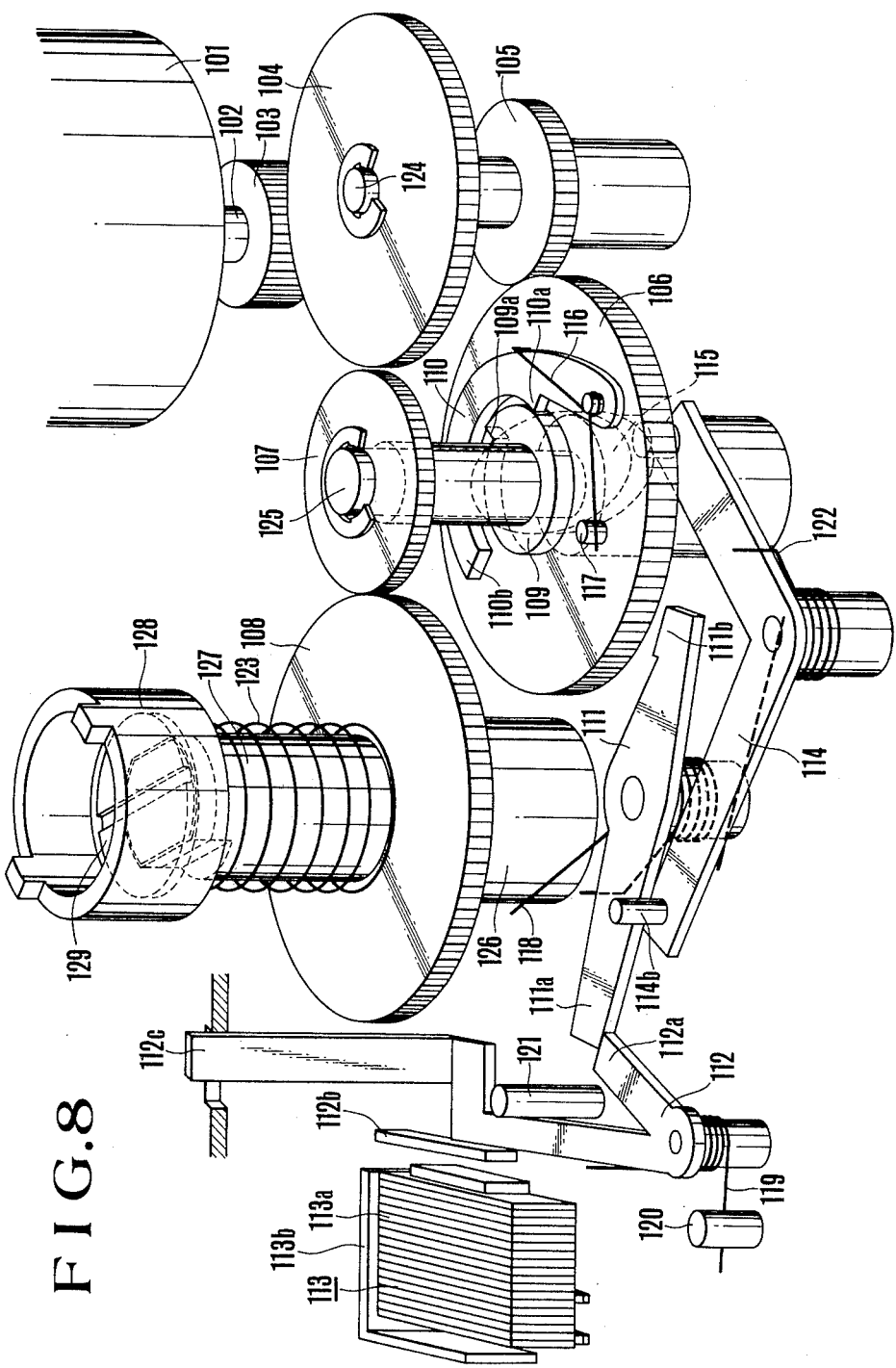

FIGS. 6 to 8 differ from the embodiment shown in FIGS. 1 to 3, in that the electromagnet 113, corresponding to the electromagnet 13 of FIG. 1, is arranged to be connected to a shutter release in the camera body so that the electromagnet can also be used for driving a camera release actuating member. The clutch operating arrangement employed in the embodiment of FIGS. 6 to 8 is identical with that of the embodiment of FIGS. 1 to 3. Therefore, like parts are indicated by like reference numberals, with the reference numberals of FIGS. 6 to 9 having 100 added to each of them.

In performing a rapid sequence photographic operation with the embodiment of FIGS. 6 to 8, the camera release actuating magnet operates concurrently with the completion of a film winding operation. Hence, the shutter release begins as each film winding operation ends. After completion of a film winding operation in this embodiment, the camera release actuating magnet operates concurrently with commencement of the shutter release to cause the clutch to operate. However, the operation of the clutch at the beginning of the shutter release presents no problem. Because the clutch arrangement is identical with that of the first embodiment, the detailed structural description of the clutch is omitted here. The following description, therefore, covers mainly the camera release actuating member exclusive of the structural arrangement illustrated in FIG. 6.

Figure 9:
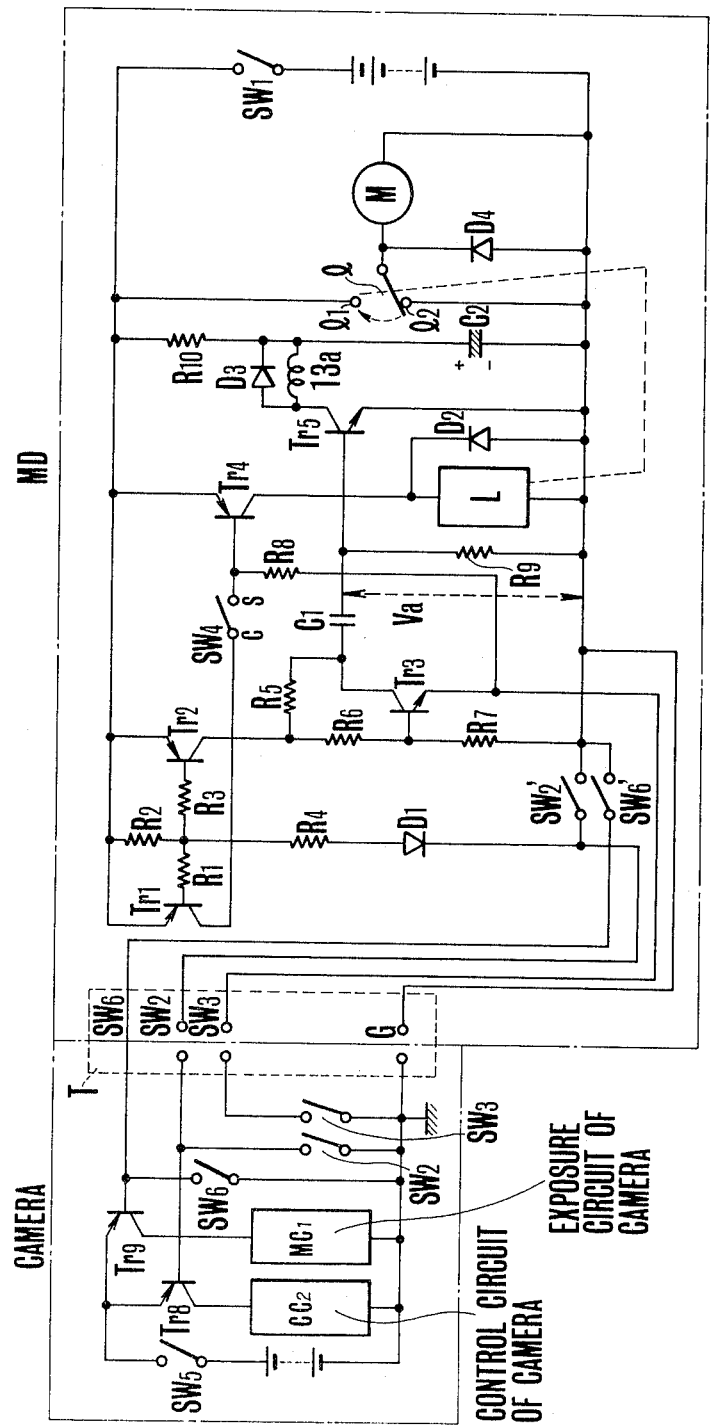
FIG. 9 is a circuit diagram showing the circuit arrangement of the device shown in FIGS. 6 through 8.

In FIG. 9, which shows a control circuit for the electric motor drive device of FIG. 6, switches SW1, SW2, SW3, SW4, SW5 and SW6 are similar to those used in the embodiment of FIG. 4. Reference numerals M and L also indicate a motor and a motor controlling relay with the electric motor drive device shown in FIG. 9 in a position of completing winding the film through one frame, and with the power source switches SW1, SW5 on, when the switch SW6 is turned on by depressing the shutter release button, the light measuring circuit MC1 of the camera, is energized through the transistor Tr9. When the shutter button is further depressed, and the switch SW2 is turned on, the control circuit CC1 is energized through the transistor Tr8.

When the switch SW1 is closed at the time a in FIGS. 10A to 10J, the capacitor C2 begins to charge. Assuming that the voltage between the base of a transistor Tr5 and ground is Va, when the transistor Tr2 is turned on by the switch SW2, a capacitor C1 causes the voltage Va to exhibit a differentiated waveform as shown in FIG. 10G from the time b to the time c. This change momentarily turns on the transistor Tr5 causing the capacitor C2 to discharge. A current then flows and causes the camera actuating magnet 113 to operate and move its armature to the position shown in FIG. 7.

As a result of the operation of the actuating magnet 113, the armature 112b of the lever rotates counterclockwise. This moves the camera release actuating member 112c to the left to actuate the camera release (not shown). Concurrently, the end 112a of the lever 112 releases the end 111a of a lever 111 to cause the clutch to operate in the same manner described with respect to FIGS. 1 to 3. With the clutch thus operated or disengaged, the film is allowed to settle and the load or stress is removed for the next film winding operation at a time c.

When the transistor Tr5 is turned off, the capacitor C2 begins to charge. Upon completion of the shutter release at a time d, the switch SW3 is turned on. The transistor Tr3 is then turned on and the voltage Va exhibits the differentiated waveform −V at the time d in FIG. 10G. Moreover, the transistor Tr4 is turned on and the relay L excited. This moves the contact 1 toward the contact point 11. The motor rotates to start winding of the film at a time d. Upon completion of the film winding operation at time e, the switch SW3 is turned off, and the transistors Tr3 and Tr4 are turned off.

Since the transistor Tr2 is on, when the transistor Tr3 is turned off, the voltage Va returns to the same condition as at the time b and produces a positive going differentiated waveform. The latter turns the transistor Tr5 on and causes the capacitor C2 to discharge. This energizes the magnet 113 and results in operation of the clutch. The camera release is then actuated at the time f. Meanwhile, at the time e, the transistor Tr4 is turned off to de-energize the relay L. The contact 1 is urged toward the contact point 12 and the motor stops. At subsequent times g, h, i and j, the same conditions prevail as at the points d, e, f and g. After the release button is freed, such as at the time k, the last release in the continuous rapid exposure operation is completed and the transistor Tr3 is turned off.

Because the switch SW3 is turned on when the shutter release is completed at the time j, and the transistors Tr3 and Tr4 are on, the contact of the relay L is at the point kb, the motor is rotating and the film is being wound, i.e., at time k. When the film is wound at time l, the transistor Tr2 is turned off. This, in turn, turns off the transistor Tr3 and the motor stops. However, because the transistor Tr2 is off, the voltage Va does not change and the transistor Tr5 is also inoperative. In the non-continuous or single frame operation, the power source switches are turned on at the time m in FIGS. 10K to 10T, and the capacitor C2 charges as the switch SW1 is turned on. Meanwhile, the selector switch SW4 is turned on to set the system for single frame operation. In this condition, when the shutter release button is depressed at the time n, the switches SW6 and SW2 are turned on. The shutter release operation of the camera begins in the same manner as previously described.

Turning on the switch SW2 turns on the transistor Tr2 and the voltage Va exhibits a differentiated waveform +V. The transistor Tr5 is then turned on and excites the magnet 113. This actuates the camera release in the same manner as previously described. At the same time o, the clutch operates. Because the switch SW2 is turned on at this time, the transistor Tr1 is turned on to prevent the transistor Tr4 from turning on.

Upon completion of the shutter release at time p, the switch SW3 is turned on, and the latter turns on the transistor Tr3. Then, the voltage Va exhibits a differentiated waveform −V and the transistor Tr5 does not turn on. When the shutter release button is freed from its depressed condition at a time q, the switch SW2 is turned off. Transistors Tr1 and Tr2 are then turned off. At this time, because the switch SW3 is on, when the transistor Tr1 is turned off, the transistor Tr4 is turned on. This results in excitation of the relay L. With the relay L excited, the motor rotates and actuates a film winding operation. At time r, upon completion of the film winding operation, the switch SW3 turns off. The transistor Tr4 now turns off and the relay L is de-energized. The motor 101 then comes to a stop. At the subsequent times s, t, u, v and w, the elements assume the same conditions as at the respective times n, o, p, q and r.

In the embodiment of FIGS. 6 to 8, as described in the foregoing, a camera release actuating magnet which is arranged to operate at the commencement of the camera release also performs the same function as the clutch operating magnet employed in the embodiment of FIGS. 1 to 3. In continuous rapid sequence operation, when the shutter release is permitted to occur concommitantly with the film winding action, the clutch is used. Hence, the film can be exposed to light in a stable condition and stress and load removed for the next film winding operation. In the embodiment of FIGS. 6 to 8, the clutch is operated at the beginning of the first shutter release in a continuous rapid sequence exposure operation and at the beginning of a shutter release in a single frame operation. However, because the time lag between the operation of the camera release actuating magnet and exposure of the film to light is fixed to begin with, the combined use of this magnet operating the clutch does not adversely affect the speed of the film feed.

The film release actuating electromagnet employed in the embodiment of FIGS. 6 to 8 operates at the beginning of the camera release and it is arranged to actuate the shutter in a range finder type camera, to actuate an automatic diaphragm and a mirror in a single lens reflex camera, to actuate an automatic exposure arrangement in an automatic exposure camera or to actuate an automatic focusing arrangement in an automatic focusing camera. This camera release actuating electromagnet may be disposed either within a camera body or within the electric motor drive, and may be operated either by a power source in the camera body or a power source arranged for the motor drive.

As mentioned in the foregoing, the electric motor drive of the present invention uses a clutch which is operated concurrently with completion of film winding in a rapid sequence exposure operation to cut off a portion of the film winding transmission gear system. This permits the film to be exposed to light in a settled state and any load or stress can be removed for the next film winding operation to ensure that the latter can be performed smoothly.

By using a single magnet to perform the combined functions of a camera release actuating electromagnet and a clutch operating magnet, the desired effects of the electric motor drive can be attained without increasing the size thereof. Moreover, compared with a motor drive with an additional electromagnet for the sole purpose of operating the clutch, the aforementioned arrangement of the invention not only increases the system reliability but has the advantage in terms of reduction in power consumption.

While embodiments of the invention have been described in detail, it will be evident to those skilled in the art that the invention may be embodied otherwise, without departing from its spirit and scope.

What is claimed is:

1. For a camera, an electric motor drive settable into a continuous driving mode in which sequences having a shutter release operation and a film winding operation are effected on a continuous basis, and a non-continuous driving mode in which the sequences having the shutter release and film winding operation are non-continuous, comprising:
   A. a driving source;
   B. a transmission mechanism connected to said driving source and having a transmission linkage, said linkage producing a stressed condition during the film winding operation;
   C. cut-off means in said transmission mechanism for cutting off the transmission linkage thereof; and
   D. switch-over means operatively connected to said cut-off means for causing said cut-off means to operate at the end of every driving operation in the continuous driving mode and for rendering said cut-off means inoperative in the non-continuous driving mode between the film winding and shutter releasing operations a period of time sufficient to remove the stressed conditon.

2. An electric motor drive according to claim 1, wherein said switch-over means include an electromagnet and a control circuit for driving said electromagnet.

3. An electric motor drive according to claim 1, wherein said transmission mechanism is coupleable to a film winding mechanism in the camera body.

4. An electric motor drive according to claim 1, wherein said switch-over means include an automatic change-over control circuit for automatically effecting change-over from an operative state to an inoperative state.

5. An electric motor drive device to be used in combination with a camera having a part to be driven by a film winding driving force through a film winding cycle and a release means, said device having a continuous drive mode in which a release operation of the release means and a winding cycle are effected continuously and a non-continuous drive mode in which the release operation of the release means and the winding cycle are effected non-continuously, said device comprising:
   A. a driving source;
   B. transmission means drivingly connected to said driving source, said transmission means being arranged to transmit said driving force to said part of the camera to be driven;
   C. a cut-off means operatively connected to said transmission means for cutting off transmission of the transmission means to the part to be driven; and
   D. operating means operatively connected to said cut-off means and said release means to render said cut-off means operative at the end of the film winding cycle in the continuous mode but inoperative in the non-continuous mode.

6. An electric motor drive device according to claim 5, wherein said operating means includes a control circuit which produces a pulse signal at the end of the film winding cycle.

7. An electric motor drive device to be used in combination with a camera which is provided with a film winding mechanism, said device comprising:
   A. an electric motor;
   B. a control circuit connected to said motor;
   C. a transmission means coupled to the motor transmitting the driving force of said motor to the film winding mechanism;
   D. winding completion signal receiving means connected to the control circuit for receiving a film winding completion signal representative of completion of a film winding action of the film winding mechanism to effect control over said motor;
   E. cut-off means in said transmission means to cut off a transmission of said transmission means and including operating means connected to said control circuit; and
   F. switch-over means for switching between a continuous photography mode and a single-frame photography mode, said switch-over means being operatively connected to said control circuit to prevent said cut-off means from operating when said single-frame photography mode is selected by said switch-over means and to operate said cut-off means after completion of a film winding action when the continuous photography mode is selected by said switch-over means.

8. An electric motor drive device according to claim 7, wherein said control circuit includes a time constant circuit and a pulse signal forming circuit which is controlled by said time constant circuit; and said cut-off means including an electromagnet means connected to said pulse signal forming circuit.

9. An electric motor drive device according to claim 8, wherein said pulse signal forming circuit including a capacitor, a circuit for charging said capacitor and a discharge circuit; and said electromagnet means is connected to said discharge circuit.

10. An electric motor drive device to be used in combination with a camera having a release means and a film winding mechanism for performing a film winding action, said device comprising:
   A. an electric motor means;
   B. transmission means for transmitting the driving force of said motor to said film winding mechanism;
   C. a film winding completion signal receiving means for receiving a signal representative of completion of a film winding action of said film winding mechanism;
   D. operating means for cutting off the transmission of said transmission means; and E. control circuit means for connecting said film winding completion signal receiving means to said motor means, said control circuit means having said motor means and operating means also connected thereto and being arranged to cause said operating means to operate upon completion of a film winding action and to prevent said operating means from operating upon completion of film winding when film winding and shutter release are effected non-continuously.

* * * * *